L. T. VELEN.
CUTTER MECHANISM FOR HARVESTERS.
APPLICATION FILED AUG. 19, 1906.
957,280.
Patented May 10, 1910.
4 SHEETS—SHEET 1.
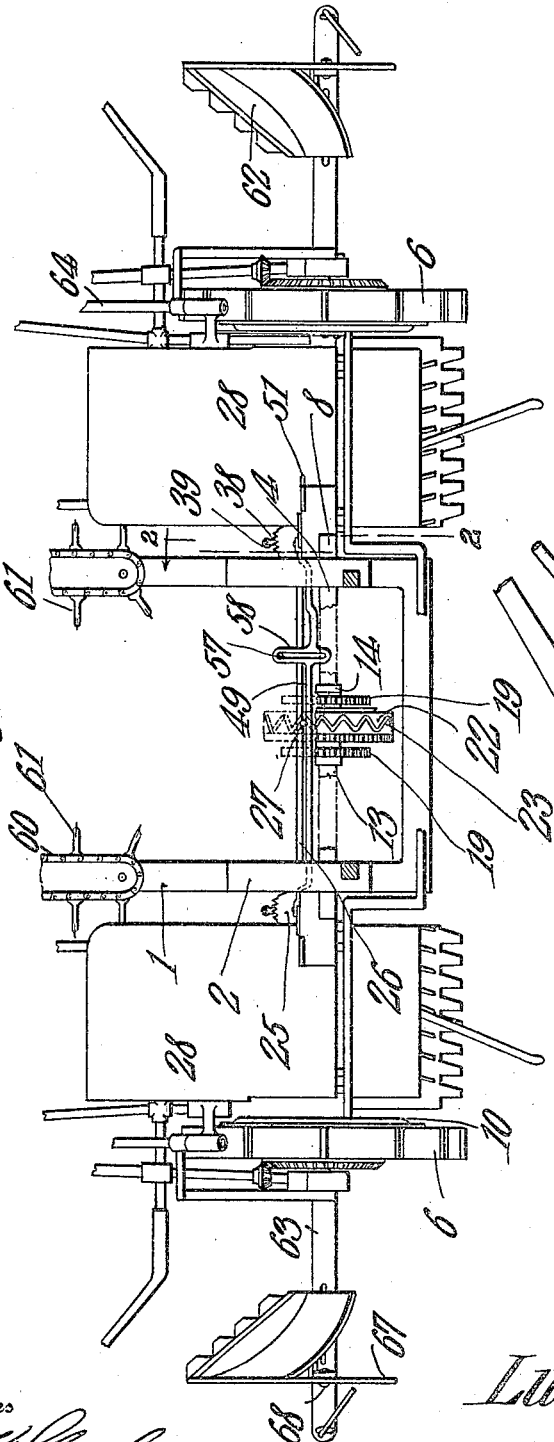
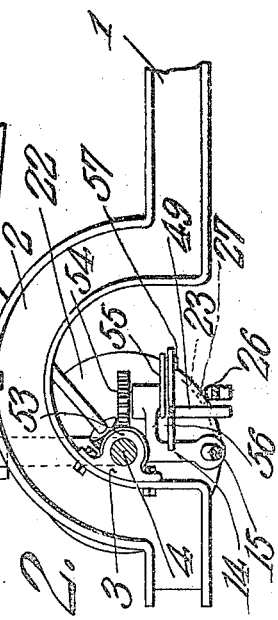
Witnesses
Inventor
Luther T. Velen.
By
Attorneys

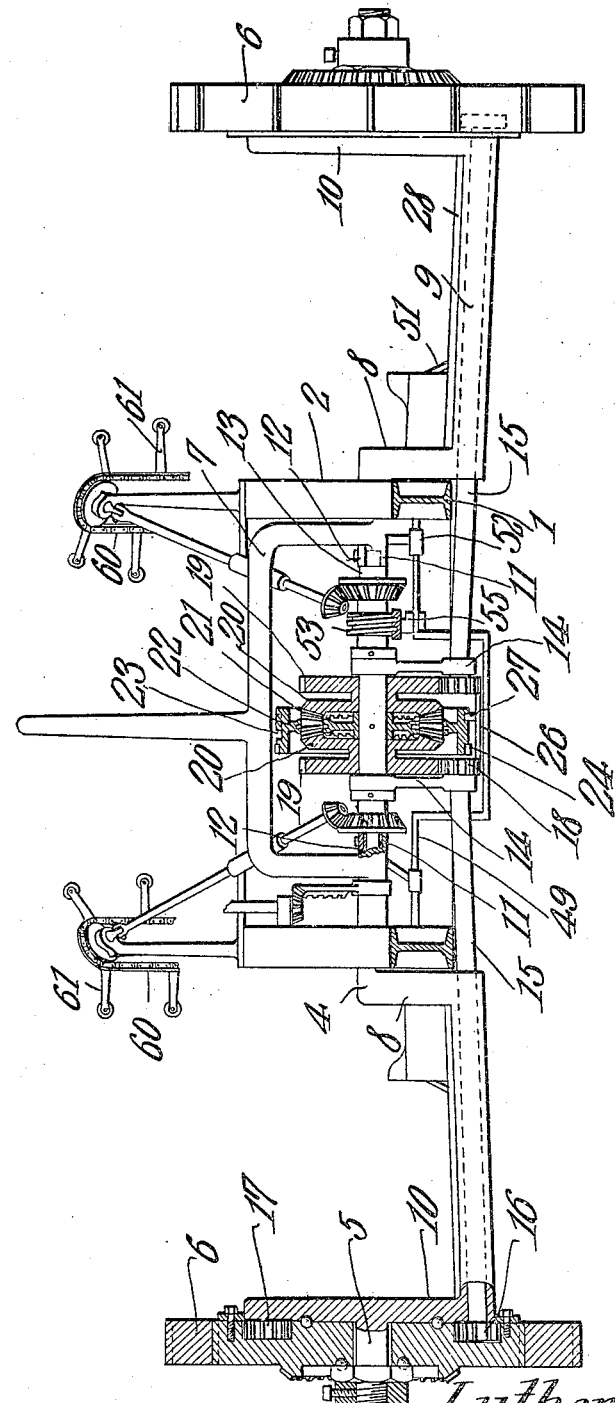

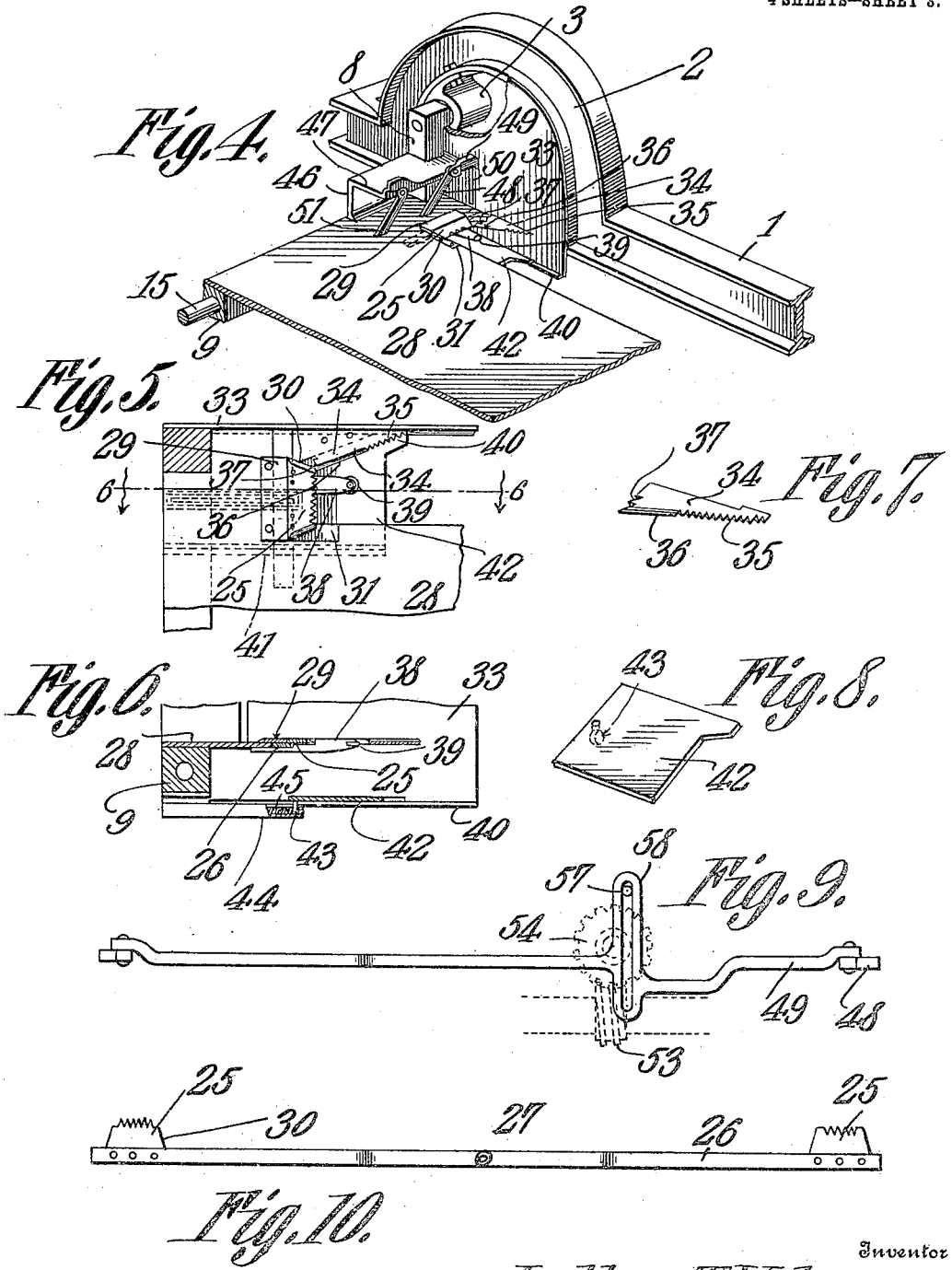

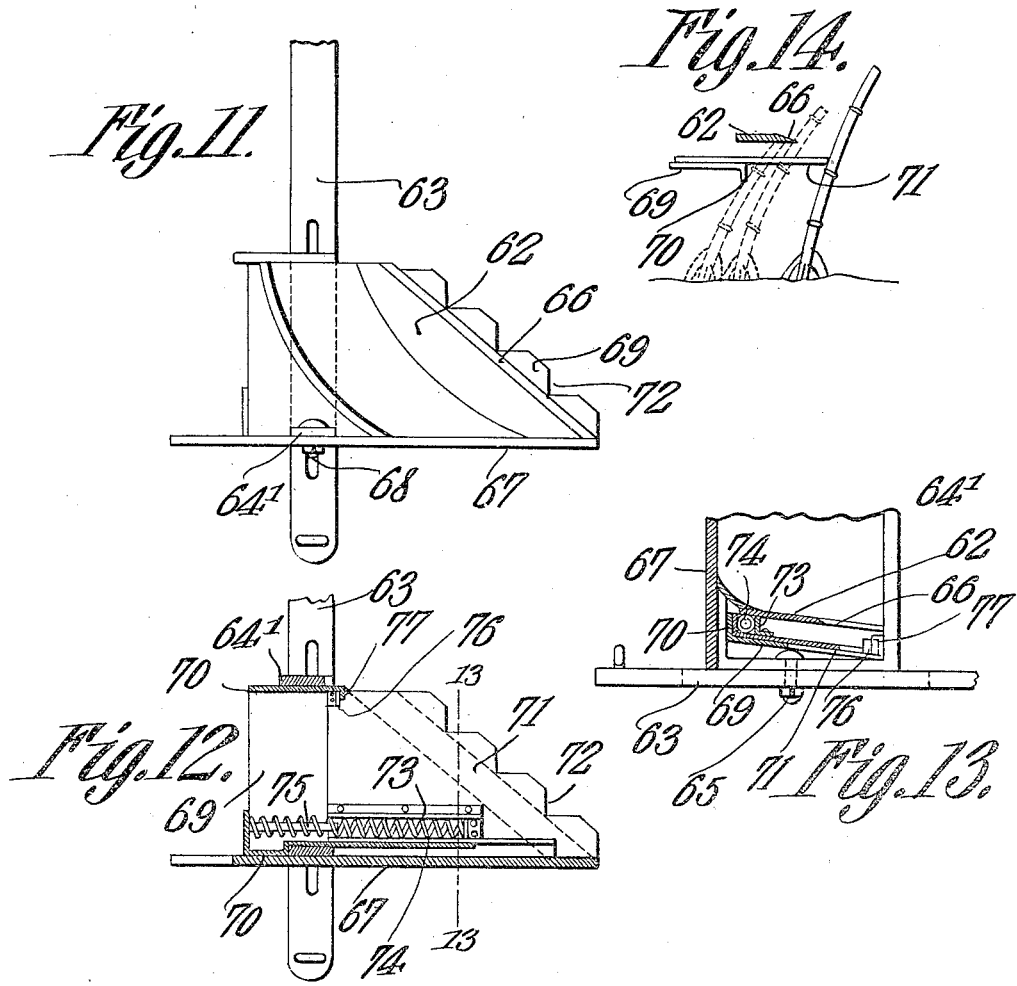

UNITED STATES PATENT OFFICE.

LUTHER THEODORE VELEN, OF CLEBURNE, KANSAS.

CUTTER MECHANISM FOR HARVESTERS.

957,280. Specification of Letters Patent. Patented May 10, 1910.

Original application filed November 1, 1907, Serial No. 400,553. Divided and this application filed August 19, 1908. Serial No. 449,331.

*To all whom it may concern:*

Be it known that I, LUTHER T. VELEN, a citizen of the United States, residing at Cleburne, in the county of Riley and State of Kansas, have invented a new and useful Cutter Mechanism for Harvesters, of which the following is a specification.

This invention has relation to cutter mechanisms for harvesters, and it consists in the novel construction and arrangement of its parts, as hereinafter shown and described.

The subject matter of the present invention is divided out of my prior application for Patent in the United States for harvesters, filed November 4th, 1907, Serial No. 400,553.

An object of the present invention is to provide means for slightly bending the stalks away from the cutting-knife, so that tensional strain is exerted on that side of the stalk which is first engaged by the knife, in order to lessen the work of the latter.

A further object of the invention is to provide an improved form of cutting mechanism, and to provide for the division of the stalks, in order that they may be more readily and uniformly acted upon by the cutters.

A still further object of the invention is to provide an improved means for depressing the weeds or other small growths in advance of the cutting knives, in order to prevent the operation of the latter on any material other than the corn stalks.

A still further object of the invention is to provide an improved form of cutting knife, and to employ means whereby the stalks may be bent inward toward the frame as the severing operation progresses, and thus keep the knife clear of the stalks.

In the accompanying drawings:—Figure 1 is a top plan view of the cutting mechanism. Fig. 2 is a vertical sectional view cut on the line 2—2 of Fig. 1. Fig. 3 is a rear elevation of a portion of the cutting mechanism, showing the parts in sections. Fig. 4 is a detailed perspective view looking at one of the rear corners of the frame, and showing one of the inner cutters and its associated mechanism. Fig. 5 is a detailed plan view of one of the cutters and weed-depressor. Fig. 6 is a transverse sectional view of the same, cut on the line 6—6 of Fig. 5. Fig. 7 is a detailed perspective view of the auxiliary stationary cutter, detached. Fig. 8 is a similar view of the weed-depressing plate. Fig. 9 is a plan view of the mechanism for feeding the stalks inward after the cutting operation. Fig. 10 is a sectional plan view of the inner cutters and their carrying bar. Fig. 11 is a plan view of one of the outer cutters. Fig. 12 is a sectional plan view taken in the plane below the cutter, and showing the weed-depressor. Fig. 13 is a transverse sectional view of the parts shown in Fig. 12, cut upon the line 13—13 thereof, and Fig. 14 is a sectional view of the outer cutter, and weed-depressor, illustrating the manner of operation of the said parts.

The beams 1, form a portion of the frame work of the harvester or the other implement to which the cutting apparatus is applied, and the said beams are provided at intermediate points with the arched portions 2. The bearings 3, are fixed to the under sides of the arched portions 2, of the beams 1, in which is journaled the axle, 4, of the machine; this axle is provided at its ends with the spindles 5, upon which the traction wheels 6, are mounted. The axle 4, has a centrally disposed arch 7, located between the bearings 3, and at a point outside of each of the said bearings 3, the axle is turned down, forming an arm, 8, which is then bent outward to form a sleeve 9, that is disposed at a slight angle to the horizontal, the outer end being lowermost, and to the outer end of each sleeve portion 9, is secured a solid disk 10, the inner face of which bears against the inner side of the traction wheel 6.

At the juncture of the ends of the arch 7, with the main cylindrical portions of the axle 3, the latter has a pair of alined journal bearings 11, having removable cap pieces 12, and arranged for the reception of the reduced end portion of a horizontally disposed shaft 13. On this shaft are pivoted two hangers 14, the lower ends of which form bearings for the inner ends of a pair of shafts 15, that extend through the sleeves 9, of the axle, and are provided at their outer ends with the pinions 16, that mesh with the internal annular racks 17, formed in the inner faces of the ground wheels 6, and as the said ground wheels rotate, movement is imparted from the racks 17, to the pinions 16, and thence to the shafts 15.

At the inner ends of the shafts 15, are located the pinions 18, that intermesh with a pair of gear wheels 19, of equal diameter. The gear wheels 19, are loosely mounted upon the shaft 13, and to each said gear wheel is secured a beveled gear 20, forming part of a compensating gear; the teeth of the two beveled gears 20, face each other and are intermeshed with intermediate beveled pinions 21, of which there may be any desired number.

Rigidly secured to the shaft 13, is the hub of a disk 22, the web of which is cut away at intervals to form openings for the passage of the beveled pinions 21, and the carrying shafts of these pinions are mounted in bearings formed in the disk.

The periphery of the disk 22, is provided with a zig-zag cam groove 23, and further carries a gear wheel 24, which may intermesh with a pinion, (not shown) or other means whereby movement may be transmitted from the said disk to other moving parts of the machine, upon which the cutting apparatus is mounted.

The compensating gearing which connects the two shafts 15, operate in the usual manner to permit the turning of either traction wheel faster or slower than the other one, without interfering with the operation of the other portions of the machine which depend on this gearing for movement.

The present mechanism is designed for simultaneously cutting four rows of corn, and, for convenience, the outermost rows are cut by relatively stationary knives, while the innermost rows are cut by knives that reciprocate in a plane transversely of the length of the rows, and these reciprocatory knives are provided with saw-teeth edges, in order to render the cutting operation more effective.

The two reciprocatory cutting blades 25, are carried by the opposite ends of a transversely disposed bar 26, the central portion of which is slightly depressed to pass under the compensating gear of the shaft 13, and at the central portion of the bars is an angularly disposed lug carrying an anti-friction roller 27, that enters the zig-zag cam groove 23, of the disk 22, so that as the latter is rotated the cutter-bar is reciprocated.

Secured to the sleeve portion 9, of the axle 3, is a plate 28, that extends forward from the axle in a horizontal plane and receives the butt ends of the stalks from the inner rows, there being two of such plates, one at each side of the machine. One edge of the plate is slightly spaced from the adjacent side bar of the frame of the machine, forming a recess into which the row of corn is guided, and the cutter is disposed at the base of this recess, so as to sever the stalks in consecutive order. The cutting blade is secured to the carrying bar and is arranged in the plane immediately above the plate 28, while the bar is, in part, guided by a small plate 29, that is secured to the plate 28, to the rear of the blade. The blade is provided with angularly disposed ends which are tapered to form cutting edges, 30, which coact on one side with a stationary guard-plate 31, carried by the plate 28, and on the opposite side with a similar plate (not shown) that may be carried by a vertical plate or guard 33, bolted or otherwise secured to the plate 28, and serving as a closure for the arched portion 2, of the beam 1, so that the stalks cannot pass through the arch after being cut by the cutting knives.

In addition to the reciprocatory cutter, auxiliary stationary cutting blades 34, are employed. Each of these blades is in the form of a right-angled triangle, that edge which forms the hypotenuse being provided with saw-teeth 35, for a portion of its length, and a beveled cutting edge 36, for the remaining portion, while at the rear end of the blade are auxiliary cutting-teeth 37, which co-act with the saw teeth of the main blade in case any stalks, grass or weeds should enter the triangular space between the stationary and the reciprocatory blades.

The auxiliary stationary blades 34, are intended to sever, or partially sever, any stalks which are not directed into contact with the reciprocatory knife, and they may be omitted, if desired.

In order to divide the work of the knife, a fixed prong 38, is secured to the plate 28, and projects forward under the cutting blade, said prong having a roller 39, at its forward end, and serving to direct the stalks of corn to one or other sides, and in a measure distribute the work along the entire length of the blade.

The lower edge of the vertical plate 33, is provided with an inwardly extending flange 40, and depending from the plate 28, is a flanged strip 41. These flanges serve as a support for a weed depressing plate 42, that extends in advance of the knives, and operates to depress any weeds or grass, although it will yield rearwardly when brought into contact with the stalks of corn, owing to the greater resistance afforded by the latter. Depending from the lower face of the rear portion of the plate 42, is a pin 43, having a disk-shaped lower end that enters a cylindrical casing 44, and is engaged by a helical compression spring 45, that tends to hold the plate in its forward position. The spring is of sufficient strength to resist movement of the plate when brought into contact with any material lighter than cornstalks, but when engaged by the latter the spring will yield to permit rearward movement of the plate.

Secured to the rear edge of the plate 28, is a vertically disposed butt-plate 46, against which the butt-end of the stalks strike after passing the cutting blade, and from the top of the butt-plate projects a forwardly extending guard 47, that prevents the stalks from jumping upward. As the stalks fall down on the plate 28, with their butts against the plate 46, it becomes necessary to shift them laterally, in order to clear the space to the rear of the knife. For this purpose a feed-pawl 48, is pivoted at one end of a reciprocatory bar 49, the pawl at one end co-acting with one of the plates 28, and the pawl at the opposite end co-acting with the other said plate. The ends of the bar 49, project through openings formed in the plates 33, and said plates have vertical recesses 50, so that on the inward movement of a pawl it will pass wholly beyond the plates 33. As the pawl-carrying bar is reciprocated, the stalks lying on the plate 28, are fed away from the plane of the knife and are moved beyond the retaining pawl 51, that is pivoted to the forward edge of the guard plate 47, so that the stalks cannot move back as the feeding pawl is retracted.

The central portion of the bar 49 is bent into U shape, in order to pass under the compensating gearing carried by the shaft 13, and the said bar is mounted in guiding brackets or hangers, 52, that are carried by the main axle or shaft 3.

On the shaft 13, is a worm 53, that meshes with a worm-wheel 54, that is secured to the upper end of a crank-shaft 55, mounted in a bracket 56, projecting from one of the hangers, 14. At the lower end of this shaft is a crank 57, carrying a pin, which enters a yoke 58, that is carried by the bar 49, this mechanism serving to transmit the reciprocatory movement to the pawl bar.

The two inner rows of corn are directed into the space between the plate 28 and the side bar 1. As the corn in some instances will be bent or blown down, it becomes necessary to provide for causing the stalks to assume a proper position before they engage with the cutting blade, and, for this purpose, an endless belt 60, having lifting fingers 61, is arranged at one side of each of the passages.

The outer cutters 62, are carried at the outer ends of the bars 63, the inner ends of said bars being rigidly secured to the shafts 64. The bars 63, are bent in the manner shown, in order to clear the ground wheels 6, and to present the outer arms of the bars in the vertical plane of the axis of the ground wheels. To the outer end of each bar 63 is secured a U shaped bar 64', by means of a securing bolt 65.

The cutting blade and the butt deflector 66, are secured at one end to a vertically disposed plate 67, by a bolt 68. The cutting blade 66 is arranged approximately at an angle of 45 degrees to the longitudinal axis of the machine, and the deflector 66, that is above the ground is formed of a section of a hollow sphere, being curved transversely in the direction of its length, so as to form a curved pocket that will receive the butts of the stalks, and deflect the same laterally to the bar 63. The blade is furthermore slightly inclined to the horizontal, being highest at its outer edge, so that the stalks will tend to ride down the blade and deflector by gravity. This arrangement furthermore facilitates the cutting of the stalks, the latter being placed under the strain in the manner herein described, and the cutting being accomplished by a line oblique to the length of the stalk.

Arranged below the cutting blade is a plate 69, that is inclined in the same direction as the blade, and is provided at its opposite sides with vertical flanges 70, that are secured in any suitable manner to the vertical arms of the U shaped bar 64'. This plate serves as a guide and support for a weed depressor 71, that projects forward to the cutting edge of the blade, and is provided with a plurality of notches 72, against the walls of which the stalks may engage prior to the cutting operation.

The weed-depressing plate 71, carries a flanged guide or casing 73, for the reception of a helical compression spring 74, the rear end of which is guided by a rod 75, that projects from a flange on the rear end of the plate 69. This spring tends to force the weed depressor forward, and movement in this direction is limited by the engagement of a lug 76, on the plate, with a stop flange 77, carried by the plate 69. The strength of the spring is sufficient to hold the weed-depressing plate forward when the latter is in engagement with weeds, grass or similar growth, so that the latter may not come in contact with the cutting blade. When the weed depressing plate is engaged by a cornstalk, the plate will be forced forward and the stalk will be severed, its butt swinging against the curved deflector 66, and being guided on to the blade-carrying bar 62.

Thus it will be seen that mechanism is provided for operating simultaneously upon four different rows of stalks.

Having described my invention, what I claim as new and desire to secure by Letters Patent, is:—

1. The combination with a cutter, of means for guiding the stalks thereto, means for reciprocating the cutter, a stationary guiding tongue for distributing stalks along the length of the cutter and a growth depressor located below the cutter.

2. In combination, a reciprocatory cutter, a guiding channel through which the stalks are directed against the cutter, a stationary guiding tongue by which the stalks are distributed along the length of the cutter, a stationary auxiliary cutter arranged at the end of the channel and slightly in advance of the reciprocatory cutter and a growth depressor located below the cutter.

3. In combination, a reciprocatory cutter, a channel through which the stalks are guided against said cutter, and a yieldably mounted weed depressor arranged under the cutter.

4. In combination, a cutting blade, a weed-depressing plate arranged under the blade and serving to depress small growth, said depressor being yieldable to permit the blade to engage the corn-stalks.

5. In combination, a cutter blade, a weed-depressing plate arranged under the blade, and a spring forming a bearing for the depressor, said spring being yieldable to permit corn-stalks to come in contact with the blade.

6. In combination, a cutting blade, a supporting plate upon which the stalks pass after cutting, a butt-plate against which the stalks strike and a guard-plate to prevent the upward movement of the stalks.

7. In combination, a cutting blade, a supporting plate upon which the stalks pass after the cutting operation, a reciprocatory feeding member for moving the stalks laterally and a retaining pawl for engaging and holding the stalks from return movement.

8. In combination, a cutting blade, a supporting plate upon which the stalks pass after cutting operation, a butt-plate against which the stalks strike, a guard-plate, a reciprocatory feeding finger for moving the stalks laterally from the butt-plate, and a retaining pawl or finger pivoted to the guard-plate and arranged to hold the stalks from return movement.

9. In combination, a main frame, a cutter, and a spring pressed depressor arranged in front of said cutter and adapted to move rearward under the cutter when brought into engagement with a stalk.

10. In combination, a cutting knife, and a yieldable depressor guided for bodily rearward movement.

In testimony that I claim the foregoing as my own, I have hereto affixed my signature in the presence of two witnesses.

LUTHER THEODORE VELEN.

Witnesses:
C. A. G. SUNDSTROM,
ADOLF BERGHEIMER.